Sept. 7, 1937. C. E. CARPENTER 2,092,499
DOUGHNUT MACHINE
Filed Aug. 13, 1936 4 Sheets-Sheet 1
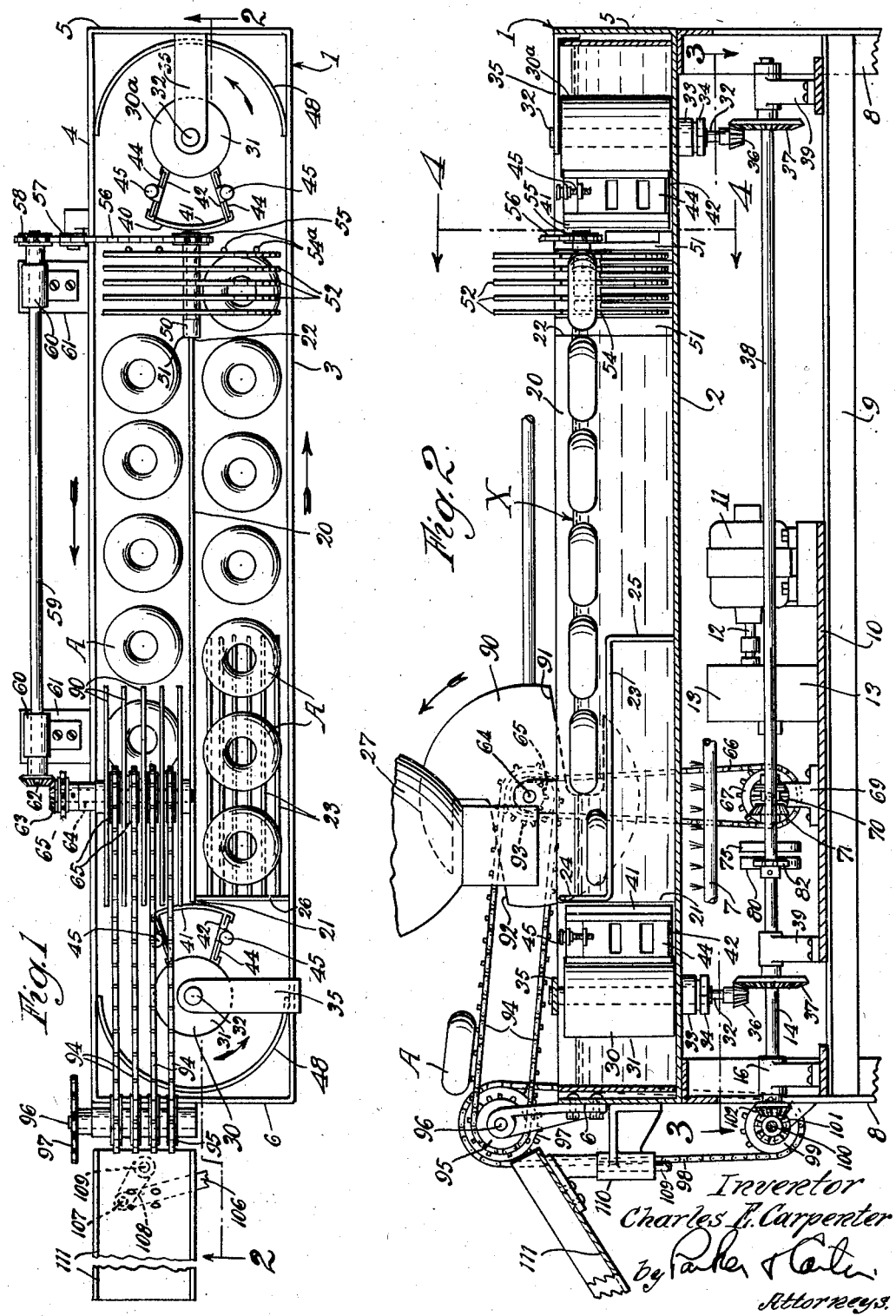

Sept. 7, 1937.  C. E. CARPENTER  2,092,499
DOUGHNUT MACHINE
Filed Aug. 13, 1936  4 Sheets-Sheet 2
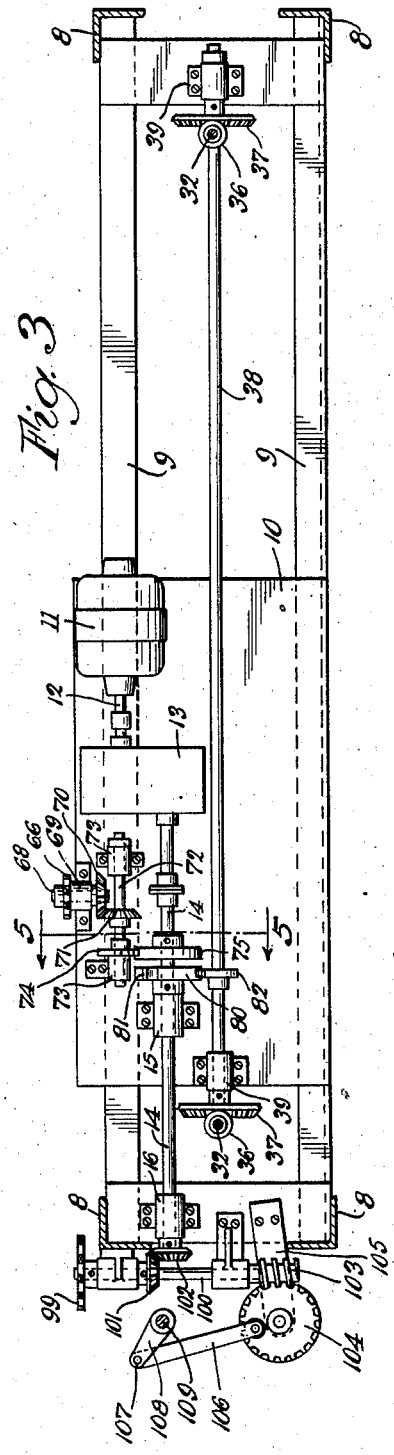
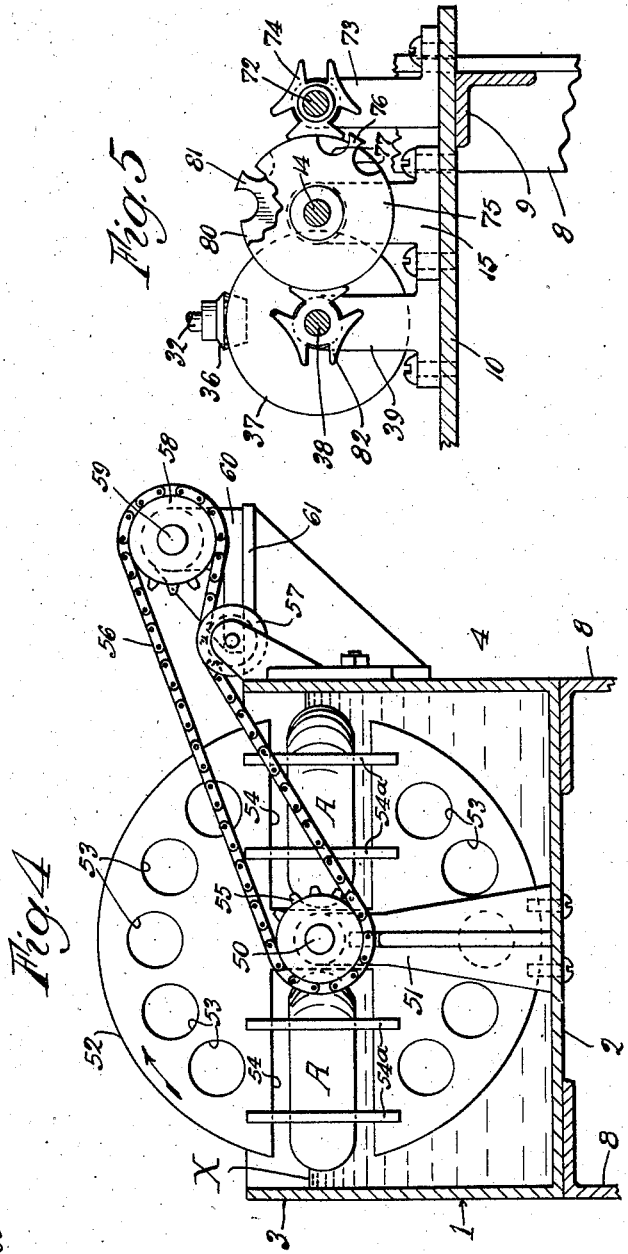
Inventor
Charles E. Carpenter
by Parker & Carter
Attorneys.

Sept. 7, 1937. C. E. CARPENTER 2,092,499
DOUGHNUT MACHINE
Filed Aug. 13, 1936 4 Sheets-Sheet 3

Inventor
Charles E. Carpenter
by Parker & Carter,
Attorneys.

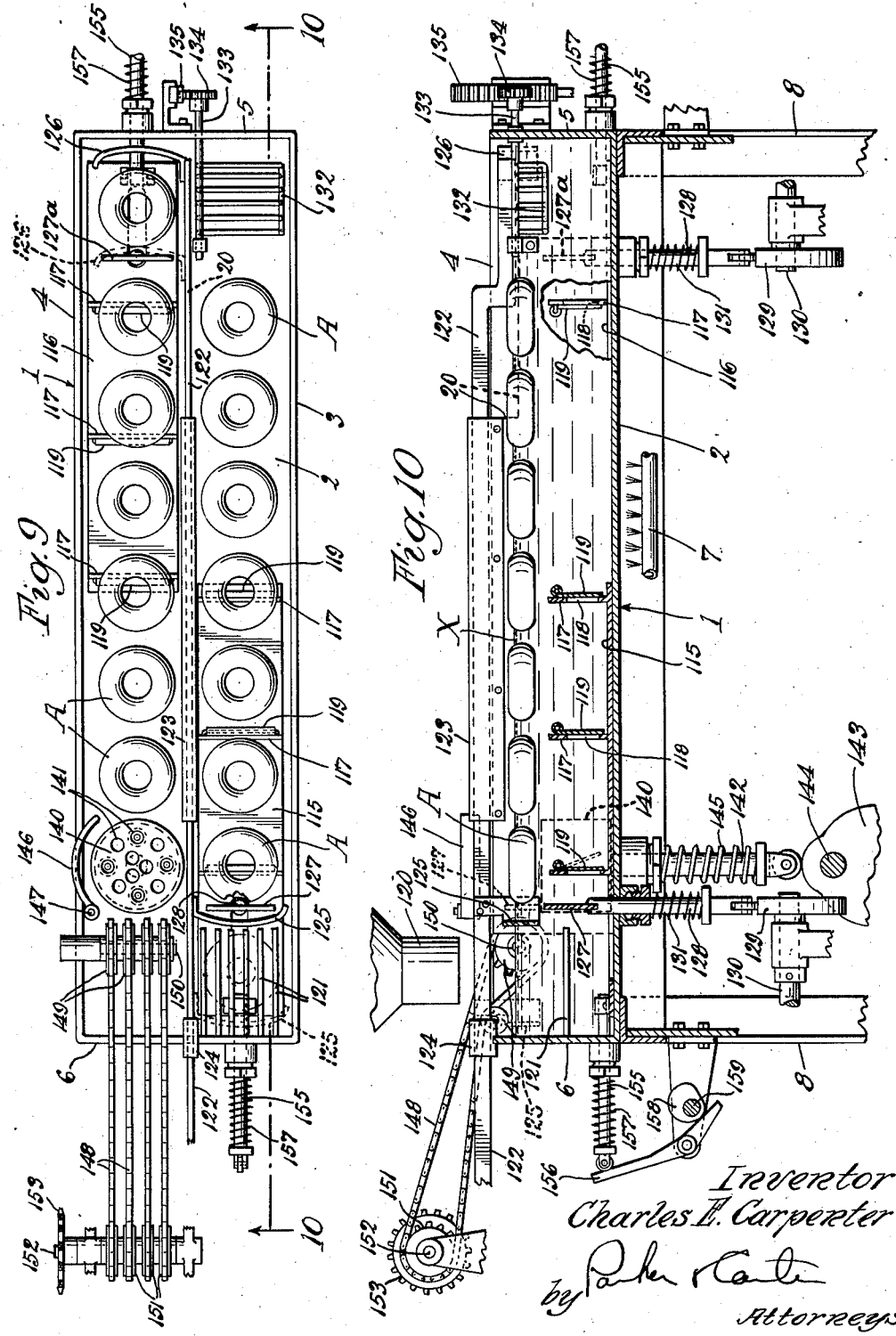

Patented Sept. 7, 1937

2,092,499

UNITED STATES PATENT OFFICE 2,092,499

DOUGHNUT MACHINE

Charles E. Carpenter, Chicago, Ill., assignor to Givaudan-Delawanna, Inc., New York, N. Y., a corporation of New York

REISSUED
MAY 21 1940

Application August 13, 1936, Serial No. 95,823

33 Claims. (Cl. 53—7)

My invention relates to an improvement in doughnut cooking machines and has for one object the provision of a machine which shall be simple and economical to manufacture and to employ.

Another purpose is the provision of improved means for conveying the doughnuts along or through a body of cooking liquid during the cooking operation.

Another purpose is the provision of improved turning means for turning the doughnuts while passing through their cooking path.

Another purpose is the provision of improved means for ejecting or removing the doughnuts from the cooking liquid.

Other purposes will appear from time to time in the course of the specification and claims.

I illustrate my invention more or less diagrammatically in the accompanying drawings wherein:

Figure 1 is a plan view;

Figure 2 is a section on the line 2—2 of Figure 1;

Figure 3 is a section on the line 3—3 of Figure 2;

Figure 4 is a section on the line 4—4 of Figure 2;

Figure 5 is a section on the line 5—5 of Figure 3;

Figure 9 is a plan view of a variant form of the device; and

Figure 10 is a diagrammatic section on the line 10—10 of Figure 9.

Like parts are indicated by like symbols throughout the specification and drawings.

Figure 6:
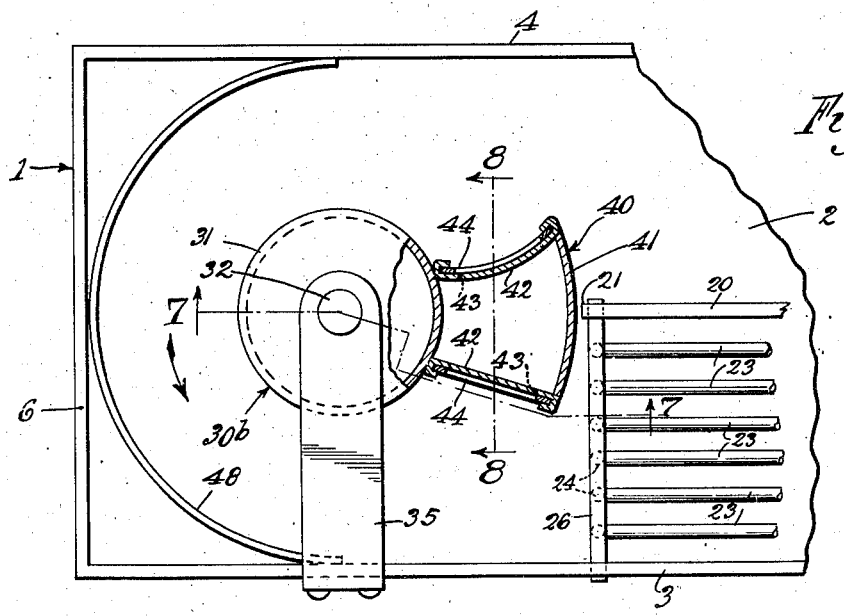
Figure 6 is a partial plan view of a variation of the device.

Referring to the drawings, and first to the form of Figure 1 and following, I generally indicates a cooking container having a bottom 2, side walls 3, 4 and end walls 5, 6. 7 is any suitable heating means, such as a gas burner, it being understood that I may employ any suitable heating means with the device. 8 is any suitable supporting frame including cross braces 9. 10 indicates a shelf upon which is positioned any suitable driving motor 11 with a shaft 12 extending to any suitable gear reduction device 13 which drives a main shaft 14 mounted for example in bearings 15, 16.

20 indicates a central partition extending along the center of the container 1 and terminating at its opposite ends at 21 and 22. 23 indicates a series of rods having upturned ends 24 and downturned ends 25, as shown in Figure 2. The upturned ends 24 may be joined by a transverse member 26 which extends between the partition 20 and the side wall 3. The rods 23 are alined with any doughnut blank discharging means diagrammatically illustrated at 27. It will be understood that through any suitable means not shown in detail the doughnut blanks or raw doughnuts or other articles to be cooked are dropped into the body of cooking grease, at a point above the rods 23.

Figures 7, 8:
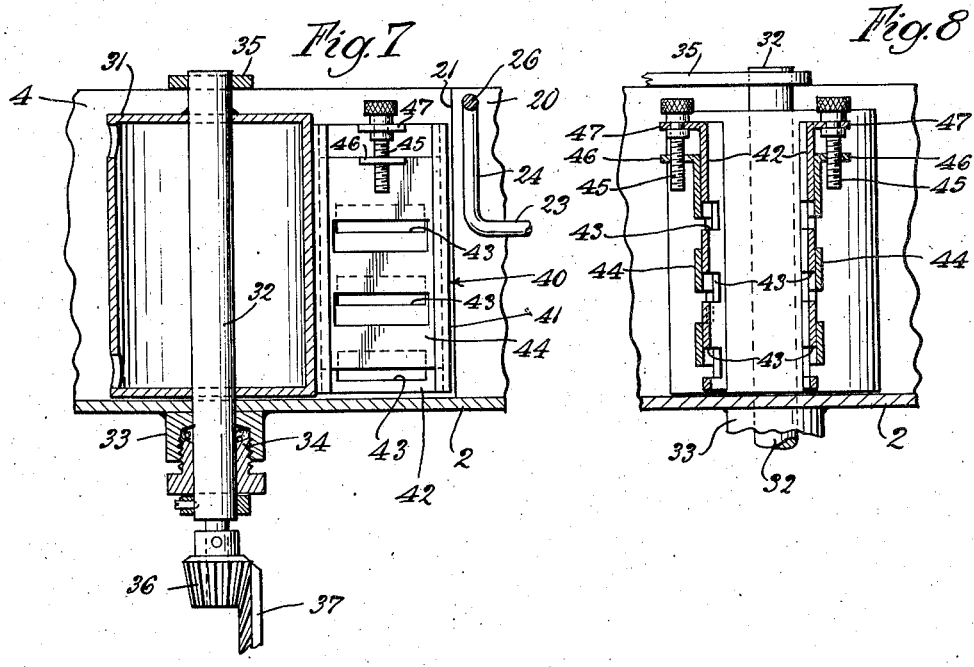
Figure 7 is a section on the line 7—7 of Figure 6.
Figure 8 is a section on the line 8—8 of Figure 6.

The level of grease, indicated at X, is sufficiently high so that the raw doughnuts are completely immersed when they are resting on the rods 23. They shortly swell up and begin to float, as is shown in Figure 2. The grease is circulated in one direction, along the space between the partition 20 and the side wall 3, and in the opposite direction along the space between the other side of the partition 20 and the other side wall 4. I illustrate, as practical means for maintaining this circulation, and for thereby conveying the cooking doughnuts floating with the liquid, a pair of vertically axised rotors 30, 30a, which may be identical or substantially identical, and of which only one need be described in detail. A slightly variant form 30b is shown in Figures 6, 7 and 8.

Each such rotor includes a hollow cylindrical body portion 31, mounted on a shaft 32, which passes through bearings 33 and any suitable packing glands 34. The upper end of the shaft may be mounted in any suitable bracket 35. The lower end of the shaft terminates in a beveled gear or pinion 36 in mesh with the gear 37 on the shaft 38 rotatably mounted in brackets 39. There is one of the gears 37 for each of the rotors, as shown in Figure 2, and the gears 37 and the shaft 38 rotate in unison, whereby the rotors are also rotated in unison and, preferably, at the same speed. Projecting outwardly from each of the drums 31 is a vane structure 40 in the form of a hollow segment having an outer arcuate wall 41 concentric with the shaft 32 and radial or slightly curved walls 42 connecting it to the drum 31. I may, if desired, and as shown in detail in Figures 6, 7 and 8, provide the walls 42 with a plurality of ports 43 with which are alined port slides 44 which may be vertically adjusted by adjusting screws 45 which pass through ledges or flanges 46 in the slides to which they are screw threaded, and apertured ledges or flanges 47 in the vane structure itself. It will be understood that any other means may be supplied for providing ports which are preferably of variable area. Thus the movement of the grease can be varied by increasing or diminishing the open area of the vane structure or of the walls 42.

In order to assist in the pumping effect resulting from the rotation of the two rotors, I may also provide arcuate inner walls 48, as shown at the opposite ends of Figure 1, which conform generally to and are only slightly spaced from the arcuate walls 41 of the vane structures. The result of the rotation, in unison, of the two rotors is that there is a circulation of the cooking liquid in the direction of the arrows as shown in Figure 1, whereby the cooking doughnuts are carried to the right along the space between the walls 3 and 20 and are thereafter carried to the left along the space between the walls 4 and 20, referring to the position of the parts as shown in Figure 1.

In order to transfer the doughnuts from the first to the second passage so formed, and also in order to turn the doughnuts intermediate the cooking cycle, so that first one side and then the other will be cooked, I may provide a doughnut turning means between the end 22 of the wall 20 and the adjacent rotor 30a. I illustrate for example a horizontal shaft 50 which lies in the vertical plane of the wall 20 and is located preferably at or adjacent or slightly below the level X of the cooking fluid. This shaft may be mounted on any suitable bearings, for example on brackets 51. Mounted on the shaft 50 are a plurality of discs 52, said discs being provided with a plurality of apertures 53 and with larger apertures or cut-away portions 54, adjacent the level of the fluid, whereby the doughnuts can, by the circulation of the fluid, be floated into the pocket so formed, while shaft 50 and the discs 52 are at rest. In order to limit the endwise movement of the doughnuts in these pockets, I may provide any suitable terminal bars or end screen 54a.

It will be understood that, by mechanism below described, an intermittent step by step rotation is imparted to the discs 52 and the shaft 50 where, successively, each doughnut A which penetrates the pocket formed by the apertures 54 is lifted clockwise, referring to the position of the parts in Figure 4, and deposited on the opposite side of the partition 20. The driving means may include a sprocket 55 on the shaft 50, a chain 56 passing over an idler 57, and a sprocket 58 on a shelf or support 61, of which two are indicated, as shown in Figure 1. These exterior brackets 60 are shown as located on the outside of the wall 4.

At the opposite end of the shaft 59 is a beveled gear or pinion 62 in mesh with a gear 63 on a shaft 64 which in turn is driven by a sprocket 65 and chain 66 which passes around a sprocket 67 on a stub shaft 68 in any suitable bearing 69. The shaft 58 in turn is provided with a beveled gear 70 in mesh with a gear 71 on a shaft 72 rotatable in bearings 73. The shaft 72 is provided with a Geneva wheel 74 shown, in Figure 5, as having outside faces conforming to a drive disc generally indicated as 75 and provided with a tooth 76 and adjacent indentation 77 whereby, at each rotation of the disc 75, the Geneva wheel 74 is rotated one step and then remains at rest during one complete rotation of the disc 75. The disc 75, as will be clear from Figure 3, is mounted on the shaft 14 which, in turn, is driven through the gear reduction 13 from the motor 11. On the shaft 14 is a second driving disc 80 which, in turn, has a single tooth 81 which drives a second Geneva wheel 82 on the shaft 38. It thus will be realized that the motor 11, through the shaft 14 and the two discs 75 and 80, is effective to rotate the shaft 38 and thereby to rotate the rotors 30 and 30a, and is also effective to rotate the discs 52.

Another driving connection resulting from the rotation of the shaft 14 is as follows: The shaft 64 carries a plurality of discs 90, each one of which is cut away as at 91, 92, to form in effect a rotor with two pockets, these pockets serving to pick up the floating and completely cooked doughnuts, as shown in Figures 1 and 2. A rotation of the discs 90 in a counterclockwise direction, referring to the parts in the position in which they are shown in Figure 2, is effective to lift up the cooked doughnuts and to deposit them upon the conveyor structure.

This conveyor structure includes a plurality of sprockets 93 which are loose on the shaft 64. About them pass any suitable conveyor belts or chains 94 which are driven by sprockets 95 on a shaft 96, which shaft is provided with an additional sprocket 97 about which passes a chain or belt 98 which is driven by a sprocket 99 on the shaft 100. This shaft also has a beveled pinion 101 in mesh with a beveled gear 102 on the shaft 14.

At the end of the shaft 100 is a worm 103 in mesh with a worm gear 104 rotatably mounted on any suitable bracket 105. Pivoted to the disc 104 is the link 106 the upper end of which is pivoted as at 107 to a crank 108 on the shaft 109. The shaft 109 is rotatable about a vertical axis in the bearing sleeve 110 and carries at its upper end a downwardly inclined discharge chute 111 which serves to distribute doughnuts as they are discharged on any suitable table or receiving member, not herein shown.

Referring to Figures 9 and 10, I illustrate a variant form of my device in which, in the place of the rotors or pumps 30 and 30a, I may employ reciprocating slides 115 and 116, there being one in each compartment on opposite sides of the partition 20. Each such slide includes a plurality of upstanding walls 117 with ports 118 and hinged flap valves 119 which cover said ports when the slides are moved forwardly, but which swing open to permit the passage of liquid thereto, when the slide moves rearwardly. It will be understood that the direction of the movement through the ports is reversed on the two slides so that, as the slides are reciprocated, the liquid will flow along one direction on one side of the partition 20 and will flow in the opposite direction on the other side. The reciprocating slides 115 and 116 may each be actuated, for example, by a rod 155 which is held by means of a tension spring 157 in engagement with a pivoted lever 156. The lever in turn may be actuated by a cam 158 on a driven shaft 159.

120 indicates any suitable feeding means for depositing raw doughnuts on a shelf formed of a plurality of bars 121 mounted in the end wall 6 of the container. When the raw doughnut is first deposited it drops to the bottom and rests on the rods 121, and to start it on its circulation I provide a reciprocating shaft 122 which slides in any suitable sleeve 123 and the bearing 124, and has secured to it two pushers 125 and 126. When the raw doughnut drops into the position in which it is shown in Figure 9, the pusher 125 is in the dotted line position. When it is moved to the right by movement of the rod 122 it conveys the doughnut, which almost immediately puffs up and begins to float, and leaves the space ready for the ensuing raw doughnut to fall on the bars 121. Preferably the movement is so timed that the member 125 is back in the dotted line position before the next doughnut is deposited.

In order to prevent retrograde movement of the doughnut in response to rearward movement of the pusher 125, I may provide a vertically reciprocable slide 127 mounted on any suitable shaft 128 actuated by any suitable cam 129 on shaft 130, effective to thrust the slide rod 128 upwardly against compression of the spring 131. When the pusher 125 moves from the full line position in which it is shown in Figure 10 to the dotted line position the slide 127 is moved into upward position and prevents the doughnut A from being drawn back though the liquid by said movement of the member 125. Then, when the member 125 moves from the dotted line to the full line position, the slide 127 drops down to permit the next ensuing doughnut to be carried over.

When the doughnuts reach the end 5 of the cooking container they float above the turn tray generally indicated as 132, which is mounted on the shaft 133 which may be turned for example by a gear 134 in mesh with teeth of a reciprocating rack 135, whereby, by an intermittent reciprocatory half rotation the member 132 picks up a doughnut from the passage between the partition 20 and the wall 3 and turns it and drops it into the passage between the partition 20 and the wall 4. It will be understood that the pusher structure 126, as shown in Figure 9, similarly moves the doughnuts out of alinement with the turning member 132, and the slide 127a performs the same function as the slide 127.

When the doughnuts reach the end of their passage between the walls 4 and 20, they are positioned above a vertically reciprocating member 140 shown as provided with a plurality of passages 141. It will be understood that any suitable means may be employed to raise the member 140, for example the shaft or rod 142 which may be controlled by the cam 143 on the shaft 144, working against the spring 145. 146 indicates an ejector lever, pivoted as at 147, and provided with any suitable means for imparting a rotary oscillation thereto where, when the member 140 is in raised position and has lifted the doughnut above the level of the fluid, the lever 146 scrapes or ejects it over upon the conveyor belts 148 which pass about sprockets 149 of the shaft 150 and about terminal sprockets 151, on the drive shaft 152, provided with a drive sprocket 153, which may be rotated from any suitable source of power not shown.

It will be realized that I may employ any suitable driving connections, not herein shown in detail, for imparting the above described movements to the various parts, in properly timed relationship, whereby the doughnuts are ejected from above the shelves 121 by the pusher member 125, and are removed by the pusher 126 from the line of movement of the turning device 132, and are finally lifted by the member 140 and ejected by the lever 146 which delivers the finished doughnut to the conveyor belts 148.

It will be realized that, whereas I have described and illustrated a practical and operative device, nevertheless many changes may be made in the size, shape, number and disposition of parts without departing from the spirit of my invention.

I therefore wish my description and drawings to be taken as in a broad sense illustrative or diagrammatic, rather than as limiting me to my precise showing.

The use and operation of my invention are as follows:

A raw doughnut is periodically dropped from the member 27, the details of which form no part of the present invention. It is understood, however, that the time of delivery of the raw doughnut is preferably related to the timing of the various parts below set out. The rotors 30 and 30a are rotated in unison through a complete revolution and constitute, in effect, a pump at each end of the machine, whereby the hot grease is drawn and driven along each side of the intermediate partition 20 in the direction of the arrows as shown in Figure 1. That is to say, the rotor 30a draws grease towards itself along the space between the walls 20 and 3, and drives or pumps grease away from itself along the space between the walls 4 and 20. Similarly, the rotor 30 pumps grease along one passage and draws it along the other so that the result is an efficient movement of the grease, and the cooking doughnuts, along the two passages.

First a doughnut is deposited upon the bars 23. It drops to the bottom, being raw, but almost immediately puffs up and rises to the surface. Then a rotation of the two rotors takes place and the body of grease, and with it the doughnut, is moved so that space is left for the next ensuing doughnut to be delivered in the raw state upon the rods 23. Meanwhile, the ejector, including the discs 90, and the turning device, including the discs 52, are at rest. Thereafter, while the pumping rotors 30 and 30a are at rest, the ejector and the turner each are given one half a revolution.

Thus a step by step pumping movement is maintained and a step by step or intermittent movement of the turning device and ejector, the two being staggered in time so that the pumping movement moves a doughnut into the aperture of the turning device and the ejector, respectively, and in the interval between the movements the ejector and the turning device move and each deliver the doughnut which has previously been circulated, by the pumping impulse, into the pocket of the turning device or ejector.

It is characteristic of the operation of my device that each rotor in effect sucks liquid along one passage and positively pumps or expels it along the other. Considering the terminal rotor of Figure 1 shown at 30a, it draws or sucks a cooking doughnut into the pocket of the turning member 52 and, after the doughnut has been turned, hydraulically expels it from the pocket for movement along the opposite passage in the direction of the ejector. Also, the opposite rotor 30 is effective in sucking or drawing the finally cooked doughnuts into the pockets of the member 90, which thereafter rotates and deposits them on the conveyor 94. Then, as the vane continues its rotation, it hydraulically moves the last delivered blank or doughnut from beneath the cutter or delivery device 27. Note that the turning device 52 not merely turns doughnuts but is effective as a means for preventing any doughnut from penetrating into the path of the vane of the rotor 30a. The ejector member 90 performs a similar function for the other rotor and there is no chance of any doughnut penetrating into the path of the rotor.

I claim:

1. In a doughnut cooking device, a container, a cooking liquid in said container, and means for heating it, said container including a plurality of passages, extending substantially from end to end thereof, and pumping means at each end of said container, including vertically axised rotors and vanes projecting therefrom, and means for rotating said rotors, and for thereby causing the cooking liquid to flow along said passages and to carry with it doughnuts undergoing cooking, means for positioning raw doughnuts in said cooking liquid at one point in the path of movement of the liquid, and means for removing the cooked doughnuts from the liquid at another point.

2. In a cooking device, a container, a cooking liquid in said container, an intermediate partition extending along said container and terminating short of each end thereof and being adapted to form, with the opposite walls of the container, a pair of parallel passages, and pumping means at each end of said container, beyond the ends of said partition, adapted to circulate the cooking liquid through said container, in opposite directions along said passages, means for positioning raw articles to be cooked in said cooking liquid adjacent the end of one passage, and means for removing the cooked articles from the liquid at the same end of the opposite passage.

3. The structure of claim 2 including a turning member positioned adjacent the adjacent ends of the two passages, adapted to turn said articles.

4. The structure of claim 2 including a turning member positioned adjacent the opposite ends of the two passages, adapted to turn said articles, said turning member being rotatable about an axis lying in the general vertical plane of the intermediate partition.

5. In a cooking device, a container adapted to hold a supply of cooking liquid, means for heating said liquid, and means for imparting movement to said liquid in said container, including a valve structure and means for reciprocating it, said structure including a valve member adapted to impart movement to the liquid when moving in one direction, and adapted to be displaced to inoperative position when the valve structure is moved in the opposite direction.

6. In a cooking device, a container adapted to hold a supply of cooking liquid, means for heating said liquid, and means for imparting movement to said liquid in said container, including a valve structure and means for reciprocating it, said structure including a hinged valve flap and a ported member to which said valve is hinged, said valve being adapted to close a port of said member when the valve structure is moved in one direction, and being adapted to be displaced to inoperative position when the valve structure is moved in the opposite direction.

7. In a cooking device, a container adapted to hold a supply of cooking liquid, means for heating said liquid, a partition in said container, adapted to divide said container into a pair of parallel passages communicating with each other at each end of the container, and means for imparting movement to said liquid along said passages, including a valve structure in each passage and means for reciprocating it, each said structure including a valve member adapted to impart movement to the liquid when moving in one direction, and adapted to be displaced to inoperative position, when the valve structure is moved in the opposite direction.

8. In a cooking device, a container, a cooking liquid in said container, and means for heating it, said container including a pair of passages in communication with each other at opposite ends of said passages, and rotary pumping means positioned adjacent the ends of said passages, each such pumping means including a member rotatable about a vertical axis, and means for rotating it, and a vane on said member.

9. In a cooking device, a container, a cooking liquid in said container, means for heating it, said container including a pair of passages in communication with each other at opposite ends of said passages, rotary pumping means positioned adjacent the ends of said passages, each such pumping means including a member rotatable about a vertical axis, and means for rotating it, a vane on said member, and means for limiting the movement of the liquid in response to the rotation of said vane, including a wall conforming generally to the arc defined by the rotation of the exterior portion of said vane.

10. In a cooking device, a container, a cooking liquid in said container, and means for heating it, means for circulating liquid in said container, including a member rotatable about a generally vertical axis, and means for rotating it, and a vane extending outwardly from said member.

11. In a cooking device, a container, a cooking liquid in said container, means for heating it, means for circulating liquid in said container, including a member rotatable about a generally vertical axis, and means for rotating it, and a vane extending outwardly from said member, said vane being provided with a port.

12. In a cooking device, a container, a cooking liquid in said container, means for heating it, means for circulating liquid in said container, including a member rotatable about a generally vertical axis, and means for rotating it, a vane extending outwardly from said member, said vane being provided with a port, and means for varying the ported area.

13. In a cooking device, a container, a cooking liquid in said container, means for heating it, means for circulating liquid in said container, including a member rotatable about a generally vertical axis, and means for rotating it, a vane extending outwardly from said member, said vane being provided with a port, and means for varying the ported area, including a slide mounted on said vane and having portions alineable with the ported area.

14. In a cooking device, a container, a cooking liquid in said container, and means for heating it, said container including a pair of generally parallel passages, means for causing the liquid to flow in opposite directions along said passages, and means for lifting the articles undergoing cooking from one of said passages to the other, adjacent the ends of the passages.

15. In a cooking device, a container, a cooking liquid in said container, and means for heating it, means for circulating the liquid in said container, and means for lifting the articles undergoing cooking, including a plurality of parallel discs, and means for rotating them in unison, said discs being provided with alined apertures adapted to form a pocket for the articles undergoing cooking.

16. In a cooking device, a container, a cooking liquid in said container, and means for heating it, means for circulating the liquid in said container, and means for lifting the articles undergoing cooking, including a plurality of parallel discs, and means for rotating them in unison, said discs being provided with alined apertures adapted to form a pocket for the articles undergoing cooking, and being provided with further apertures adapted to permit the circulation of the liquid through said discs, at all positions of the discs, whereby the lifting means does not interfere substantially with the circulation of the liquid in the container.

17. In a cooking device, a container adapted to hold a supply of cooking liquid, means for heating said liquid, said container including a pair of parallel passages communicating with each other at their ends, and pumping means for circulating the liquid in opposite directions along said passages, including a pair of rotors, and vanes thereon, and means for imparting to them a step by step rotation, whereby each rotor draws liquid along one passage and forces it along the other.

18. In a cooking device, a container comprising a pair of channels for cooking liquid, connections between the companion ends of said channels permitting flowage of liquid between them, pumping means for circulating the liquid lengthwise of said channels, means to introduce blanks to be cooked into one end of the first channel of the pair, turning means adapted to transfer partially cooked blanks from the other end of said channel to the first end of the second channel in turned condition, means for removing fully cooked blanks from the delivery end of said second channel, and means for varying the pumping rate of said pumping means in comparison to the operations of said introducing means and said turning means and said removing means, whereby the time of cooking in said channels may be controlled, substantially as described.

19. In a cooking device, a container comprising a pair of channels for cooking liquid, connections between the companion ends of said channels permitting flowage of liquid between them, pumping means for circulating the liquid lengthwise of said channels, means for varying the rate of operation of said pumping means thereby to vary the rate of movement of cooking articles in the liquid in the channels, means for introducing blanks to be cooked into one end of the first channel of the pair, turning means adapted to transfer partially cooked blanks from the other end of said channel to the first end of the other channel in turned condition, means for removing fully cooked blanks from the delivery end of said other channel, and means for actuating the introducing means, the turning means and the removing means in regular fashion periodically, whereby the number of blanks accommodated in each channel at any time may be varied, substantially as described.

20. Means for cooking blanks and regulating the cooking interval thereof comprising an elongated channel for cooking liquid, means for introducing blanks into one portion of said channel in timed sequence, means for removing the blanks from another portion of said channel in timed sequence, means for pumping the liquid lengthwise of the channel thereby to convey the blanks from the introducing means to the removing means, while undergoing cooking, and means for varying the rate of pumping of said pumping means thereby also to vary the elapsed time of cooking of the blanks during such transfer, substantially as described.

21. In a device of the class described, the combination of a pair of parallel channels for cooking liquid, cross connections between the proximate ends of said channels permitting circulatory flow of cooking liquid through the system, pumping means adjacent to each of said cross connections, each said pumping means including a vertically axised rotary pumping member operating uniformly throughout the entire depth of the liquid, means for actuating each pumping means thereby to simultaneously withdraw liquid from one channel and deliver said liquid to the other channel for ensuring uniform flowage of the liquid completely around the system, and means for introducing blanks to be cooked into the flowing liquid and for removing cooked blanks from the flowing liquid, at suitable points in the circuit, substantially as described.

22. Means for cooking and turning blanks including a channel for cooking liquid along which the blanks are carried by flowage of said liquid to the turning position, and a turner at said position comprising a member mounted for rotation on an axis parallel to the length of the channel and having a blank accommodating slotted member, with the slot opening facing the oncoming floating blanks and closed at its back face away from said oncoming blanks, and means for turning said turner thereby to carry a blank accommodated in said opening up and out of the flowing liquid for delivery to a suitable point, substantially as described.

23. Means for cooking and turning blanks including a channel for cooking liquid along which the blanks are carried by flowage of said liquid to the turning position, and a turner at said position comprising a cylindrical member mounted for rotation on an axis parallel to the length of the channel and having a circular barrier face against which oncoming blanks may abut, said turner also having a slotted pocket for accommodation of a single blank to be turned and a slotted opening in said barrier face in alinement with said pocket and a closure at the back face of said pocket whereby oncoming blanks carried by liquid flowage are arrested against said barrier face until the turner is turned to bring the pocket into alinement with an oncoming floating blank, together with means for turning said turner on its axis periodically, substantially as described.

24. In a device of the class described, the combination of a pair of parallel channels for cooking liquid, comprising a primary and a secondary channel, means for ensuring flowage of cooking liquid in opposite directions in said channels, and a turner located in position to receive a cooking blank from the primary channel and deliver it in turned over condition to the secondary channel, said turner including a cylindrical member mounted for rotation on an axis parallel to the channels, and substantially at the flowage level of the cooking blanks carried by the liquid, said cylindrical member having a radial blank accommodating slotted pocket into which an oncoming blank is received from the liquid in the primary channel and from which the blank is thereafter delivered in turned condition to the liquid in said secondary channel, said blank being removed from the turner by flowage of the liquid in said secondary channel away from the turner, substantially as described.

25. In a device of the class described, the combination of a pair of parallel channels for cooking liquid, comprising a primary and a secondary channel, means for ensuring flowage of cooking liquid in opposite directions in said channels, and a turner located in position to receive a cooking blank from the primary channel and deliver it in turned over condition to the secondary channel, said turner including a cylindrical member mounted for rotation on an axis parallel to the channels, and substantially at the flowage level of the cooking blanks carried by the liquid, said cylindrical member having a radial blank accommodating slotted pocket into which an oncoming blank is received from the liquid in the primary channel, and from which the blank is thereafter delivered in turned condition to the liquid in the secondary channel, substantially as described.

26. In a device of the class described, the combination of a pair of parallel channels for cooking liquid, means for ensuring flowage of the liquid lengthwise of said channels, and means for turning partially cooked blanks and delivering them from one channel to the other channel, said means comprising means to turn the blanks about an axis parallel to the lengths of the channels, whereby the blanks are turned laterally of the channels, substantially as described.

27. In a cooking device, a container, a cooking liquid in said container, and means for heating it, means for circulating the liquid in said container, and means for lifting the articles undergoing cooking, including a movable member and means for moving it, said member comprising a series of vertical separated plates, having doughnut accommodating slots in horizontal alinement.

28. In a cooking device, a container, a cooking liquid in said container, and means for heating it, means for circulating the liquid in said container, and means for lifting the articles undergoing cooking, including a rotatable member and means for rotating it, said member comprising a series of vertical separated plates, having doughnut accommodating slots in horizontal alinement.

29. In a cooking device, a container, a cooking liquid in said container, and means for heating it, said container including a pair of passages connected at each end, a turning device adjacent one connection, a feed device adjacent the other, and a reciprocating structure including a portion adapted, when the structure is moved in one direction, to move a blank from beneath the feed member, and adapted, when moved in the opposite direction, to move a blank from the turning device.

30. In a cooking device, a container, a cooking liquid in said container, and means for heating it, said container including a pair of passages, the said passages being connected together at each end, a feed member adjacent one end of one of said passages, adapted to feed raw articles, a turning device adjacent the opposite end, and a pusher member and means for operating it unitarily, said pusher member being adapted, when moved in one direction, to move an article from beneath the point of delivery of the raw article, and adapted, when moved in the opposite direction, to move a turned article, in the opposite direction from the turning area.

31. In a cooking device, a container, a cooking liquid in said container and means for heating it, means for circulating liquid in said container in a sequence of timed pulsations, said means including a vertically axised rotary pumping member the effective portion of which extends throughout the depth of the liquid in said container, and means for imparting to it an intermittent rotation of uniformly timed intervals.

32. In a cooking device, a container, a cooking liquid in said container and means for heating it, means for circulating liquid in said container in a sequence of timed pulsations, said means including a vertically axised rotary pumping member the effective portion of which extends throughout the depth of the liquid in said container, means for imparting to it an intermittent rotation of uniformly timed intervals, a turning device for said articles, and means for rotating said turning device intermittently in timed relation to the pulsations caused by said rotary pumping member.

33. In a device of the class described, a reservoir which includes two channels connected to each other at each end and separated intermediate their ends by a wall, a body of cooking liquid in said channels, means for introducing blanks to be cooked at one end of one of said channels, means for removing fully cooked blanks from the adjacent end of the other channel, means for transferring the partially cooked blanks from the first channel to the second adjacent the opposite ends of the two channels, and pumping means effective uniformly throughout the depth of the liquid, located at each end of the channels adjacent the connections between the channels.

CHARLES E. CARPENTER.

CERTIFICATE OF CORRECTION.

Patent No. 2,092,499.  September 7, 1937.

CHARLES E. CARPENTER.

It is hereby certified that the above numbered patent was erroneously issued to Givaudan-Delawanna, Inc., of New York, N. Y., a corporation of New York, as assignee, whereas said patent should have been issued to the inventor, said Carpenter, as shown by the records of assignments in this office; and that the said Letters Patent should be read with this correction therein that the same may conform to the record of the case in the Patent Office.

Signed and sealed this 22nd day of February, A. D. 1938.

Henry Van Arsdale,
Acting Commissioner of Patents.

(Seal)